June 13, 1950     B. T. GROBOWSKI     2,511,160
KNOCKDOWN TYPE LAWN MOWER HANDLE ASSEMBLY
Filed July 1, 1946     2 Sheets-Sheet 1
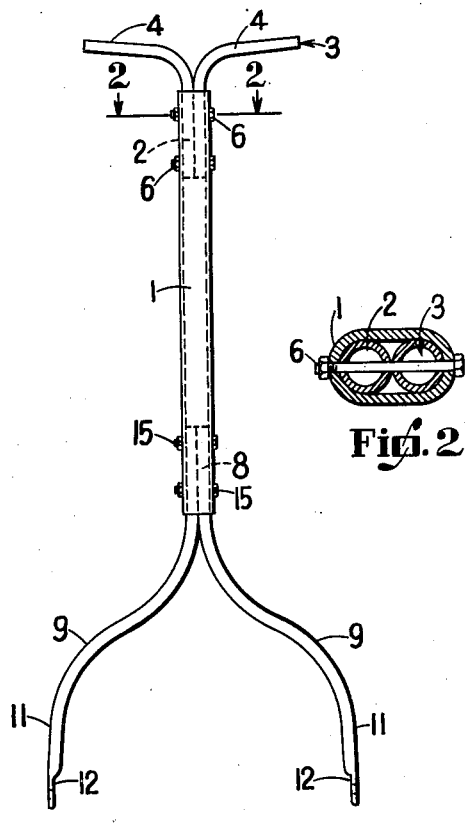
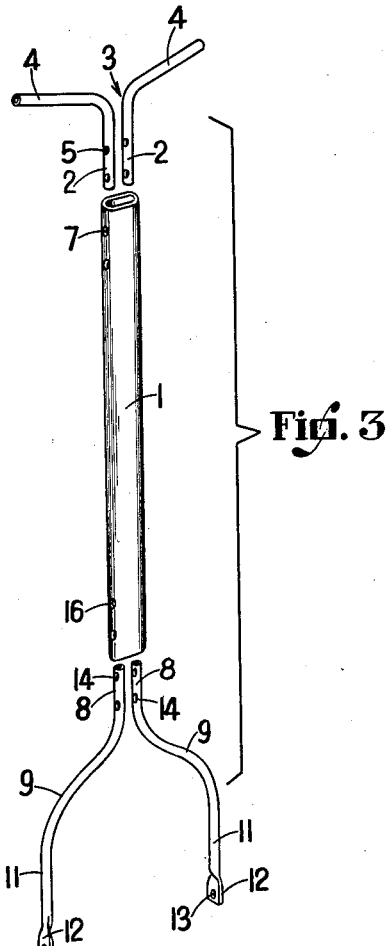
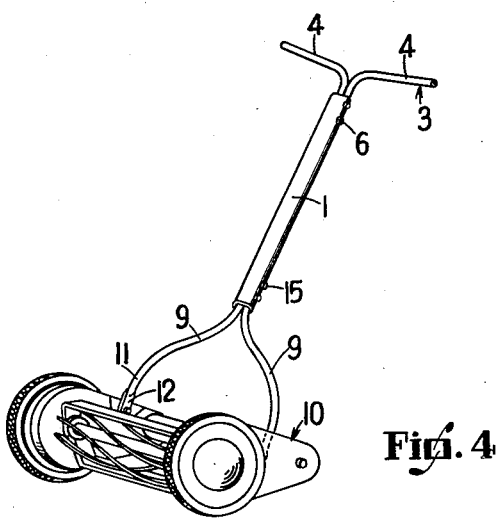
INVENTOR.
Benny T. Grobowski.
BY
ATTORNEYS June 13, 1950 B. T. GROBOWSKI 2,511,160
KNOCKDOWN TYPE LAWN MOWER HANDLE ASSEMBLY
Filed July 1, 1946 2 Sheets-Sheet 2

INVENTOR.
Benny T. Grabowski.
BY
*Corbett, Mahony & Miller*
ATTORNEYS

Patented June 13, 1950

2,511,160

UNITED STATES PATENT OFFICE 2,511,160

KNOCKDOWN TYPE LAWN MOWER HANDLE ASSEMBLY

Benny T. Grobowski, Newark, Ohio, assignor to The E. T. Rugg Company, Newark, Ohio, a corporation of Ohio Application July 1, 1946, Serial No. 680,724

6 Claims. (Cl. 16—110)

My invention relates to a knockdown type lawnmower handle assembly. It has to do, more specifically, with a handle assembly which is particularly useful on lawn mowers, although it is not limited thereto.

One of the disadvantages of present lawn mower handles, is the difficulty of shipping them with the main unit of the mower. The handles are long and cumbersome and are difficult to crate and ship. Attempts have been made to provide knockdown handle assemblies, but usually these attempts resulted in structures which were complicated and expensive, difficult to assemble, and not of the required rigidity when assembled.

One of the objects of my invention is to provide an extremely simple and inexpensive handle assembly of the knockdown type.

Another object of my invention is to provide a handle assembly which when in its knocked-down condition will occupy a minimum of space and can be packaged easily for shipping.

Another object of my invention is to provide a handle assembly which is of such a nature that its parts can be assembled easily and quickly from its knocked-down condition.

Still another object of my invention is to provide a handle assembly which is of such a nature that when its parts are assembled, the assembly will have extreme rigidity and will function effectively as a handle.

A further object of my invention is to provide a handle assembly which can be readily knocked down after any period of use for storage, shipping, or transporting.

The foregoing and other objects and advantages of the present invention will appear from the following description and appended claims when considered in connection with the accompanying drawings forming a part of the specification wherein like reference characters designate corresponding parts in the several views and wherein:

Figure 1 is an elevational view of the handle assembly in assembled condition.

Figure 2 is a transverse section taken substantially along line 2—2 of Figure 1.

Figure 3 is a view similar to Figure 1 showing how the parts can be separated.

Figure 4 is a perspective view showing the handle in use on a mower.

Figure 5:
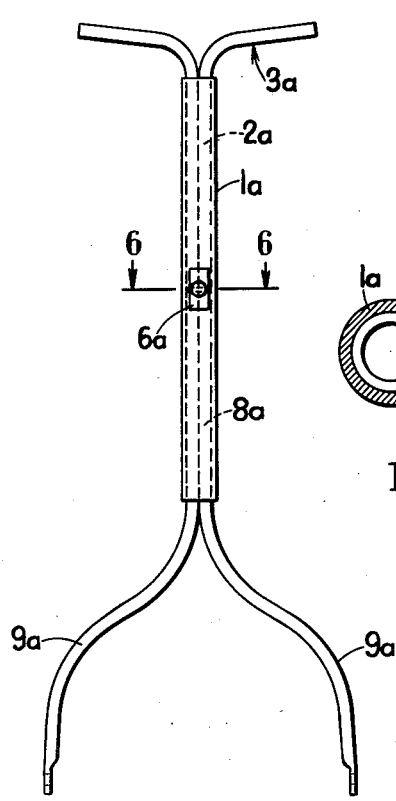
Figure 5 is an elevational view of another form of my handle assembly.
Figure 6:
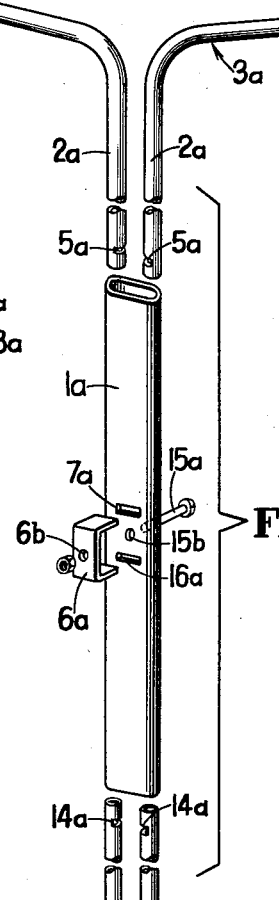
Figure 6 is a transverse section taken substantially along line 6—6 of Figure 5.
Figure 7:
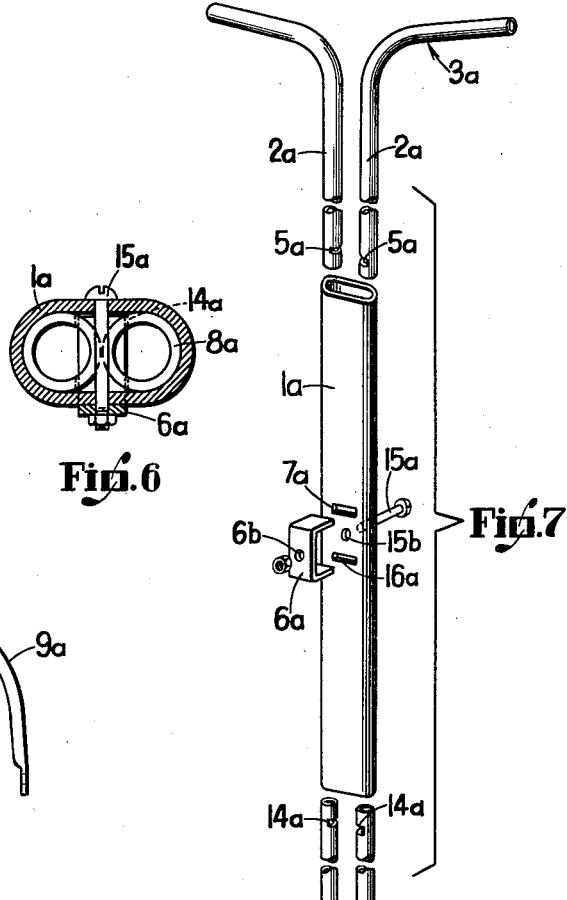
Figure 7 is a perspective view of the assembly of Figure 5 showing how the parts may be separated.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation.

In Figures 1 to 4, I have illustrated a handle assembly which includes a hollow elongated socket member 1 of flattened tubular cross-section (Figure 2). This member 1 is formed of metal and is open at each end where a pair of tubular members of circular cross-section are adapted to be inserted. The width of member 1 is such that it just snugly receives the two tubular members in side-by-side relationship while its thickness is just slightly more than the diameter of each of the two tubular members, as shown in Figure 2.

At one end, the member 1 will receive the shanks 2 of a pair of tubular handles 3. The handles 3 are formed of tubes of circular cross-section, as previously indicated, which are bent intermediate their lengths so as to form the shanks 2 and the laterally extending hand grips 4. The shanks 2 are each provided with a pair of spaced transverse bolt-receiving openings 5 adjacent their ends. When the shanks 2 are inserted in the end of socket member 1, they fit tightly therein in side-by-side relationship, as shown in Figures 1 and 2. To retain them in position, a pair of removable bolts 6 are passed transversely through the aligning openings 5 of the two shanks and through cooperating aligning openings formed in the end of member 1. Thus, handles 3 will be retained in the position shown in Figure 1 with their hand grips 4 extending outwardly in opposite directions.

The opposite end of member 1 will receive the shanks 8 of a pair of yoke arms 9 which together form a yoke for pivotally attaching the handle assembly to the mower unit 10. Each of the arms 9 is also formed of a tube of circular cross-section. This tube is bent intermediate its ends so as to provide the shank 8 at one end and the pivot arm 11 at the other end which are joined by an intermediate curved section. The extreme end of the arm 11 is flattened, as at 12, and is provided with a transverse bore 13 for receiving the pin which pivots it to the mower 10. Each of the shanks 8 is provided with a pair of spaced transverse bolt-receiving openings 14 adjacent its end. When the shanks 8 are inserted in the end of socket member 1, they fit tightly therein in side-by-side relationship, and are retained in position by a pair of removable bolts 15 which pass transversely through the aligned openings 14 of the two shanks and cooperating aligned openings 16 formed in the end of member 1. Thus, members 9 will be retained in the position shown in Figure 1 with their outer ends in diverging relationship.

It will be apparent that the handle assembly in knocked-down condition will consist mainly of five pieces, namely, the two handle members 3, the two members 9, and member 4. These may be packaged and shipped readily, occupying a minimum of space. In assembling, it is simple to insert the shanks of members 3 and 9 in the ends of member 1 and bolt them in position. The resulting handle structure will be extremely rigid.

Figure 8:
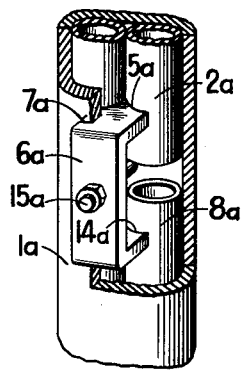
Figure 8 is a perspective view, partly broken away, of the unit which fastens together the various parts of the assembly of Figures 5 to 7.

In Figures 5 to 8, I have shown a different form of my handle assembly. In this instance, I provide the socket member 1a which is substantially the same as member 1. One end of it receives the shanks 2a of the handles 3a. The other end receives the shanks 8a of the members 9a. The members 3a and 9a are the same as members 3 and 9 except that they are provided with much longer shanks. The shanks are of such length that when inserted in member 1a, their ends almost meet, as shown in Figure 8.

I provide a different arrangement for securing the shanks in position in member 1a. Each of the shanks 2a is provided with a notch 5a at its inner end while each of the shanks 8a is provided with a notch 14a at its inner end. Each notch is formed at one side of the tubular member. When each pair of shanks is inserted in the end of member 1a, the notches are directed towards each other. Transversely extending pairs of aligning slots 7a and 16a are formed in member 1a adjacent its midpoint. The notches 5a and 14a will be aligned with the slots 7a and 16a, respectively, when the shanks 2a and 8a are inserted in member 1a. To secure the shanks in position, a U-shape clip 6a of flat cross-section is provided. This clip is provided with legs which extend through the slots 7a and 16a into notches 5a and 14a and prevent withdrawal of the shanks from member 1a. A bolt 15a is passed through aligning openings 15b in member 1a and an opening 6b in clip 6a to secure the clip in position. The bolt passes between the inner ends of shanks 2a and 8a. Thus, the shanks 2a and 8a will be held in position in member 1a by clip 6a and will be prevented from rotating therein.

As before, the structure will consist of five main parts which can be packaged and shipped readily. Also, the parts can be assembled with ease. The assembled structure will be extremely rigid.

Various other advantages will be apparent.

Having thus described my invention, what I claim is:

1. A handle assembly comprising a flattened tubular member with a socket therein of substantially oval cross-section, two pairs of separate tubular members of circular cross-section, one pair of which is adapted to be inserted in side-by-side relationship in each end of said socket, said socket having its greater cross-sectional dimension slightly greater than twice the outside diameter of one of said circular members and its minor cross-sectional dimension slightly greater than the diameter of one of said circular tubular members so that the pair of circular tubular members will fit snugly in the socket in side-by-side relationship, and transverse securing means extending through said flattened tubular member and engaging said circular tubular members for securing said circular tubular members in the socket in such relationship.

2. A handle assembly according to claim 1 wherein the circular tubular members of the pair which is to be inserted in one end of said socket are bent angularly to form shanks which fit into said socket and to form handle grips, and wherein the circular tubular members of the pair which is to be inserted in the other end of the socket are bent to form shanks to be inserted in the socket and diverging arms for attaching to a suitable unit.

3. A handle assembly according to claim 2 wherein said transverse securing means comprises bolts passing through aligning transverse openings in said flattened tubular member and said circular tubular members.

4. A handle assembly comprising a flattened tubular member with a socket therein of substantially oval cross-section, two pairs of separate tubular members of circular cross-section, one pair of which is adapted to be inserted in side-by-side relationship in each end of said socket, said socket having its greater cross-sectional dimension slightly greater than twice the outside diameter of one of said circular members and its minor cross-sectional dimension slightly greater than the diameter of one of said circular tubular members so that the pair of circular tubular members will fit snugly in the socket in side-by-side relationship, each pair of said circular tubular members extending inwardly into said socket so that the ends of the two pairs of such members are adjacent each other and notches being formed in said adjacent ends, and a U-shaped clip having legs which extend through openings in said flattened tubular member into said notches for securing said circular tubular members in said socket in such relationship.

5. A handle assembly according to claim 4 wherein the circular tubular members of the pair which is to be inserted in one end of said socket are bent angularly to form shanks which fit into said socket and to form handle grips, and wherein the circular tubular members of the pair which is to be inserted in the other end of the socket are bent to form shanks to be inserted in the socket and diverging arms for attaching to a suitable unit.

6. A handle assembly according to claim 5 including a bolt passing through transverse aligning openings in said clip and said flattened tubular member to retain said clip in position.

BENNY T. GROBOWSKI.

REFERENCES CITED

The following references are of record in the file of this patent:

UNITED STATES PATENTS

| Number | Name | Date |
|---|---|---|
| D. 117,693 | Kluter | Nov. 21, 1939 |
| D. 137,929 | Schofield | May 16, 1944 |
| 2,281,923 | Davis | May 5, 1942 |